US012152963B2

(12) United States Patent
Andersen

(10) Patent No.: US 12,152,963 B2
(45) Date of Patent: Nov. 26, 2024

(54) LIQUID LEAKAGE DETECTOR AND METHOD TO DETECT LIQUID LEAKING

(71) Applicant: JBA Consult ApS, Ishøj (DK)

(72) Inventor: Jens Bo Andersen, Ishøj (DK)

(73) Assignee: JBA Consult ApS, Ishøj (DK)

( * ) Notice: Subject to any disclaimer, the term of this patent is extended or adjusted under 35 U.S.C. 154(b) by 362 days.

(21) Appl. No.: 17/727,965

(22) Filed: Apr. 25, 2022

(65) Prior Publication Data

US 2022/0244128 A1 Aug. 4, 2022

Related U.S. Application Data

(63) Continuation of application No. PCT/DK2020/050292, filed on Oct. 26, 2020.

(30) Foreign Application Priority Data

Oct. 27, 2019 (DK) .......................... PA 2019 01261

(51) Int. Cl.
*G01M 3/16* (2006.01)
*G01M 3/18* (2006.01)

(52) U.S. Cl.
CPC .............. *G01M 3/16* (2013.01); *G01M 3/184* (2013.01)

(58) Field of Classification Search
CPC ......... G01M 3/16; G01M 3/184; G01M 3/186
See application file for complete search history.

(56) References Cited

U.S. PATENT DOCUMENTS 6,425,283 B1 7/2002 Müller
2004/0123670 A1* 7/2004 Nakatani ................. G01F 1/586
73/861.12

(Continued)

FOREIGN PATENT DOCUMENTS

CN 104949799 B 4/2018
CN 109580133 A 4/2019
(Continued)

OTHER PUBLICATIONS

Design World, "Level Feedback with Capacitive Sensors," Jul. 13, 2009, retrieved from internet Jan. 8, 2024, URL: https://www.designworldonline.com/level-feedback-with-capacitive-sensors/.

*Primary Examiner* — Paul M. West
(74) *Attorney, Agent, or Firm* — Elevated IP, LLC

(57) ABSTRACT

A liquid leakage detector, LLD, configured to detect liquid leaking from a liquid containing/guiding element. The LLD comprises a pipe configured to receive liquid leaking from a predefined area of the liquid containing/guiding element and a sensor that detects liquid entering the pipe. The LLD comprises a first connection structure configured to be connected to and hereby bring the LLD into fluid communication with a first liquid transport structure of the liquid containing/guiding element, such that the first connection structure extends from and protrudes from the first liquid transport structure and a second connection structure configured to be connected to and hereby bring the LLD into fluid communication with a second liquid transport structure, such that the second connection structure extends from and protrudes from the second liquid transport structure. The LLD comprises an insulator arranged and configured to electrically separate the sensor from the liquid transport structures.

20 Claims, 10 Drawing Sheets

(56) References Cited

U.S. PATENT DOCUMENTS

| | | |
|---|---|---|
| 2011/0199220 A1 | 8/2011 | McAlister |
| 2012/0167669 A1 | 7/2012 | Raghavendra et al. |
| 2013/0180318 A1 | 7/2013 | Howard et al. |

FOREIGN PATENT DOCUMENTS

| | | | |
|---|---|---|---|
| CN | 110346089 A | | 10/2019 |
| JP | S6111626 A | | 1/1986 |
| JP | 04236058 A | * | 8/1992 |

* cited by examiner

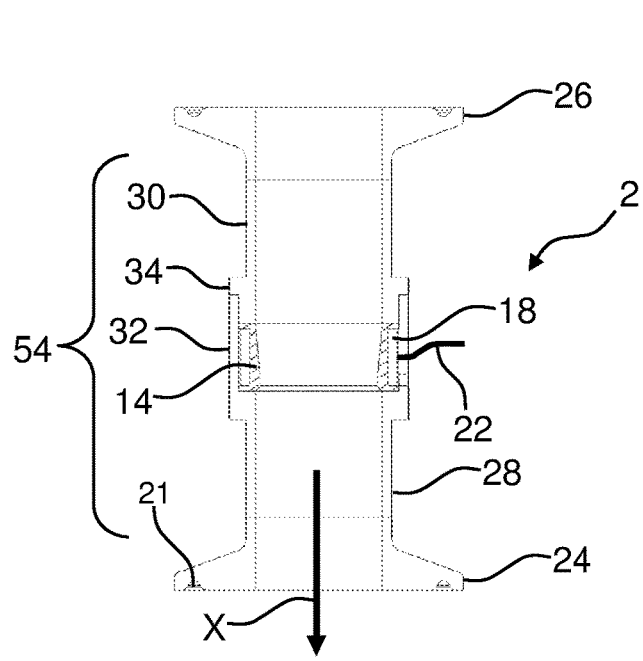
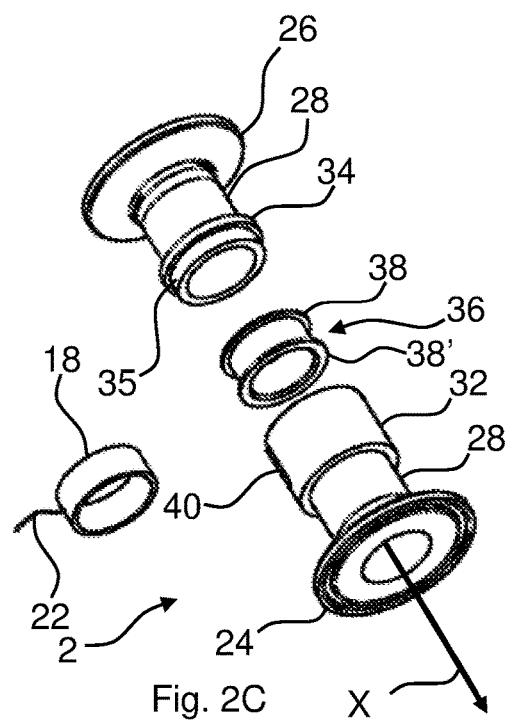
Fig. 2A
Fig. 2C
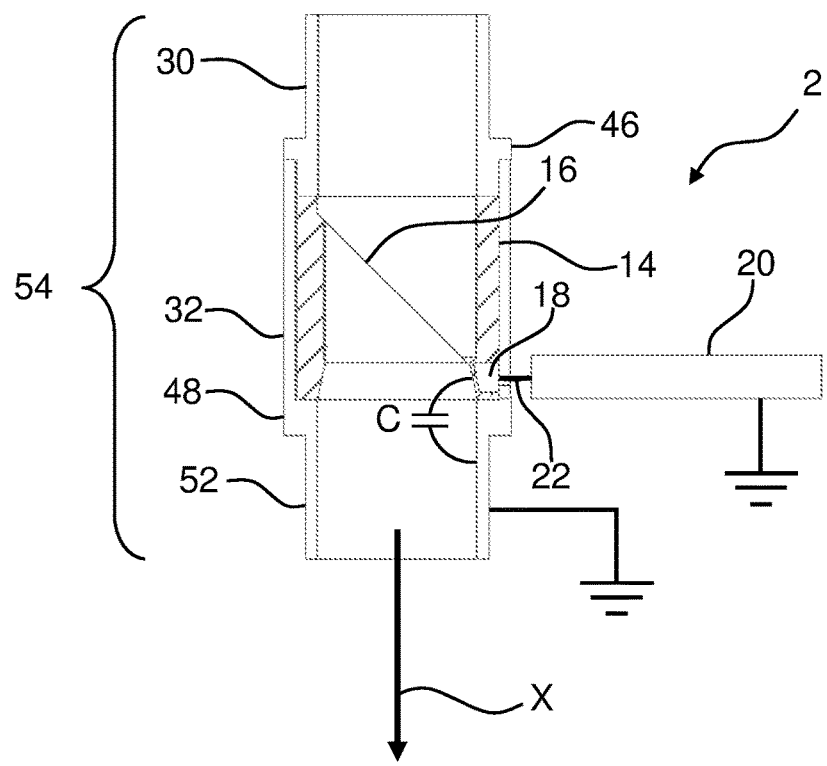
Fig. 2B

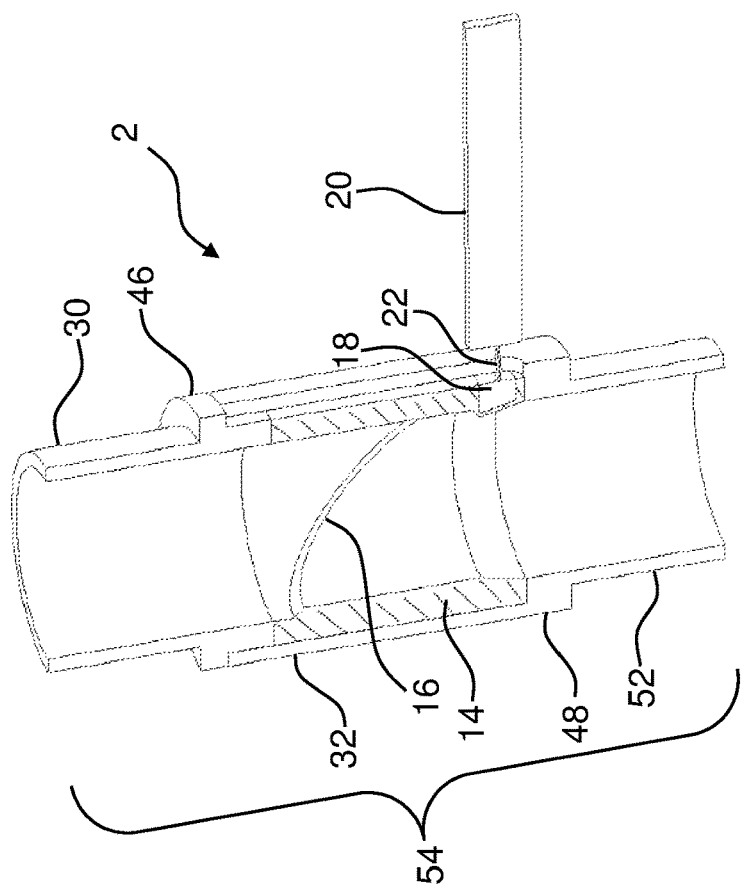
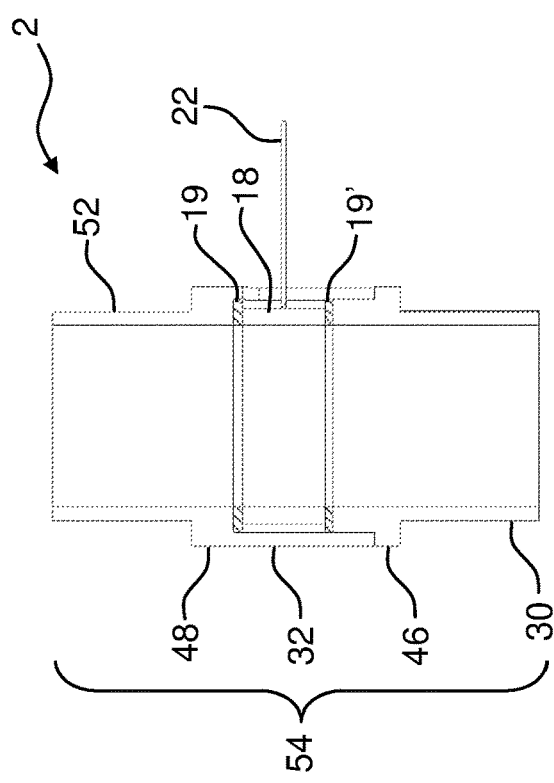
Fig. 9B
Fig. 9A

LIQUID LEAKAGE DETECTOR AND METHOD TO DETECT LIQUID LEAKING

CROSS REFERENCE TO RELATED APPLICATIONS

This application is a continuation under 35 U.S.C. 111 of International Patent Application No. PCT/DK2020/050292, filed Oct. 26, 2020, which claims the benefit of and priority to Danish Application No. PA 2019 01261, filed Oct. 27, 2019, each of which is hereby incorporated by reference in its entirety.

FIELD OF INVENTION

The present invention relates to a liquid leakage detector and a method to detect a leaking liquid.

BACKGROUND

Leakage from process systems and process equipment, such as valves, is of significant importance in many industries. Leakage is a problem that can cause loss of a product or contamination of a product. Leakage can also cause cross contamination between utility and process systems and it can cause hazardous emissions. Moreover, spillage can also be a hygienic and environmental risk.

In the prior art, leakage can be checked by detecting the pressure loss in a system over time. Another way to detect leakage is to measure the liquid level or liquid level drop of product (e.g. the fluid height in a container) or spillage measured in a spillage tray.

There are, however, several drawbacks associated with these prior art solutions. In applications in which leakage is measured by detecting a pressure loss, other factors than leakage may cause a pressure drop in the system. Furthermore, the system may be too large to allow detection of the pressure loss associated with a critical leakage because such pressure loss may be too small for the applied pressure detection device to detect the pressure loss.

In applications in which leakage is measured by detecting spillage, there is a risk of not detecting spillage even if a leakage has occurred. This may be the case if the leakage flow is not visible in a closed system.

Another way applied in the prior art to secure systems or equipment against leakage is to introduce preventive maintenance. This is an expensive and time-consuming effort and does not enable real-time monitoring.

All prior art flow meters have a detection limit and thus the prior art flow meters are not suitable for detecting a leakage flow that is smaller than the designed flow (the flow expected during use of the system, in which the flow meter is used). Accordingly, prior art flow meters are not suitable for monitoring a small leakage or the start of a leakage.

Therefore, the prior art solutions offer no way of monitoring and reacting accordingly, in case of the occurrence of a leakage.

Thus, there is a need for a method and an apparatus, by which detection of a leakage can be carried out in a fast and reliable manner. It would be desirable to reduce or even eliminate the above-mentioned disadvantages of the prior art.

BRIEF DESCRIPTION

It is an object of the present invention to provide an automated real-time monitoring of leakage from process systems or process equipment such as valves or other shut-off constructions. It is an object to provide a method and an apparatus, by which detection of a leakage can be carried out in a fast and reliable manner.

A liquid leakage detector disclosed herein is a liquid leakage detector, LLD, configured to detect liquid leaking from a liquid containing or liquid guiding element, wherein the LLD comprises:
- a pipe member configured to receive liquid leaking from a predefined area of the liquid containing or liquid guiding element; and
- a sensor configured to detect liquid entering the pipe member, wherein the LLD comprises:
- a first connection structure configured to be connected to and hereby bring the LLD into fluid communication with a first liquid transport structure of the liquid containing or liquid guiding element, in a manner in which the first connection structure extends in extension of and protrudes from the first liquid transport structure,
- a second connection structure configured to be connected to and hereby bring the LLD into fluid communication with a second liquid transport structure, in a manner in which the second connection structure extends in extension of and protrudes from the second liquid transport structure,
    wherein the LLD comprises an insulator arranged and configured to electrically separate the sensor from the liquid transport structures.

Hereby, it is possible to provide a liquid leakage detector that can detect a minimal leakage flow from a shut-off mechanism.

The LLD comprises a pipe member configured to receive liquid leaking from a predefined area of the liquid containing or liquid guiding element. The pipe member is configured to be interconnected between the first liquid transport structure and the second liquid transport structure. Accordingly, the LLD is configured to detect a liquid leakage without inserting any measurement structure into the flow of any of the liquid transport structures.

It may be an advantage that the first connection structure is arranged in the opposite end of the LLD than the second connection structure.

In an embodiment, the LLD comprises a liquid passage through which liquid entering the LLD passes, wherein the cross-sectional area of the liquid passage equals the cross-sectional area of (the distal portion of) the first liquid transport structure. Hereby, the LLD does not disrupt the flow of liquid through the LLD.

The LLD does not disrupt the flow entering the LLD from the first liquid transport structure.

The LLD is configured to detect a liquid leakage by carrying out a measurement in a position that is isolated from the flow.

It is a great advantage that the insulator is arranged and configured to constitute a complete barrier between the flow and the sensor.

The LLD comprises a sensor configured to detect liquid entering the pipe member. By the term "a sensor" is meant at least one sensor. Accordingly, in an embodiment, the LLD comprises a single sensor. However, in another embodiment, the LLD comprises several sensors.

In an embodiment, the LLD comprises two sensors.

It is an advantage that, in an embodiment, the sensor is a capacitive sensor.

In an embodiment, the LLD comprises two capacitive sensors.

The sensor is arranged and configured to detect liquid entering the pipe member.

The first connection structure is configured to be connected to and hereby bring the LLD into fluid communication with a first liquid transport structure of the liquid containing or liquid guiding element, in a manner in which the first connection structure extends in extension of and protrudes from the first liquid transport structure. In an embodiment, the first connection structure is a flange. In an embodiment, the first connection structure is a cylindric body.

The second connection structure is configured to be connected to and hereby bring the LLD into fluid communication with a second liquid transport structure, in a manner in which the second connection structure extends in extension of and protrudes from the second liquid transport structure. In an embodiment, the second connection structure is a flange. In an embodiment, the second connection structure is a cylindric body.

The insulator is arranged and configured to electrically separate the sensor from the liquid transport structures.

In an embodiment, the insulator covers the sensor and hereby insulates the sensor from the liquid, wherein the insulator constitutes at least a portion of the pipe member of the LLD.

The LLD is configured to detect liquid leaking from a liquid containing or a liquid guiding element, wherein the LLD comprises a sensor configured to detect liquid leaking from a predefined area of the liquid containing or liquid guiding element.

The liquid containing or liquid guiding element may be any element, from which a liquid can leak. The liquid containing or liquid guiding element may be a valve, a shut-off mechanism, a process system such as a piping system comprising a number of pipes, a tank system comprising a number of tanks or a process equipment system.

The sensor is configured to detect liquid leaking from a predefined area of the liquid containing or liquid guiding element or a structure arranged after said liquid containing or liquid guiding element. The sensor is configured to detect a flow of liquid in a predefined area of the liquid containing or liquid guiding element. The sensor may be arranged to detect liquid leakage from a predefined area of the liquid containing or liquid guiding element such as in an area after a valve or another shut-off mechanism.

The sensor may be any type of suitable sensor. Furthermore, any suitable sensor technology may be applied.

The sensor may be configured to detect any type of liquid.

In an embodiment, the sensor is configured to detect oil. In an embodiment, the sensor is configured to detect gasoline. In an embodiment, the sensor is configured to detect diesel engine oil. In an embodiment, the sensor is configured to detect water. In an embodiment, the sensor is configured to detect a water containing liquid.

In an embodiment, the LLD comprises a concentration structure extending along the inside surface of the pipe member, wherein the concentration structure comprises a guide structure configured to concentrate and guide liquid towards the measurement portion.

In an embodiment, it may be an advantage that the LLD is configured to be attached to the first liquid transport structure without extending into the part of the inner area of the first liquid transport structure in which liquid can flow.

In an embodiment, the insulator is arranged and configured to electrically insulate the sensor from the first connection structure and the second connection structure.

In an embodiment, the concentration structure extends along the inside surface of a pipe member. The concentration structure may have any suitable geometry and size. In an embodiment, the concentration structure comprises a portion protruding from the inside surface of the pipe. In an embodiment, the concentration structure is protruding from the inside surface of the pipe. In an embodiment, the concentration structure is protruding from the inside surface of the pipe along the entire length of the concentration structure.

The concentration structure comprises a guide structure configured to concentrate and guide liquid towards a measurement portion. The measurement portion may be a limited area in close proximity to the sensor. In an embodiment, the measurement portion is an area extending along a limited angular area of the inside surface of the pipe. In an embodiment, the measurement portion is an area extending along 180 degrees of the inside surface of the pipe. In an embodiment, the measurement portion is an area extending along 270 degrees of the inside surface of the pipe. In an embodiment, the measurement portion is an area extending along 360 degrees of the inside surface of the pipe.

In an embodiment, the sensor is arranged to detect the presence of liquid at the measurement portion even though the liquid is only present at the measurement portion for a brief moment of time (because the liquid is flowing).

An LLD disclosed herein is capable of detecting leakage from a shut-off mechanism (e.g. a valve) in a system, wherein the shut-off mechanism is arranged after an equipment. The LLD may be used in all process systems or process equipment in all process industries e.g. in the oil industry, pharmaceutical industry, food, beverage and milk industry, and it applies to pipe systems, tanks, vessels, equipment or components (hereafter referred to as "system") in which a liquid is enclosed by a shut-off mechanism such as a valve.

The LLD is configured and intended to be connected in the flow direction after the system in a position, in which the normal liquid flow flows through the LLD. Accordingly, the LLD works like a channel, an enclosed vessel or a pipe that does not cause any significant interference of the flow.

When the valve of the system shuts off the flow, the LLD is able to detect a leakage flow from a shut-off mechanism, if the shut-off mechanism should fail. The LLD can detect the leakage even when the liquid leakage is a small flow or a stream of small droplets.

In an embodiment, the LLD applies a sensor technology built into the LLD, wherein the liquid flows over the sensor in order to detect a flow that is minimal compared to the standard flow of the design flow for a given system.

The disclosed LLDs differ from prior art solutions by being capable of detecting a leakage flow that is lower than the designed flow for the given system.

An LLD disclosed herein can be installed in or after a system directly in the flow direction and directly after the shut-off construction without restricting the designed flow for the given system.

An LLD is capable of detecting a small stream or even droplets escaping the leaking system. An LLD can work both as an indicator and a transmitter. An LLD is automated via a sensor and can therefore be used for example in a control system, with an audial or/and with a visual alarm. Hereby, an LLD offers a higher process control. Accordingly, the risk of product loss and the risk of contamination can be reduced. This enables immediate control of a hazardous emission.

In an embodiment, the guide structure is configured to lead the flow of liquid to pass over the sensor. Hereby, the guide structure ensures that leaking liquid is concentrated before the liquid passes over the sensor. Accordingly, liquid detection can be carried out by the sensor even if the leaking liquid flow is very small.

In an embodiment, it may be an advantage that the guide structure comprises a portion that is angled relative to vertical when the LLD is mounted in or after the liquid containing or liquid guiding element.

Hereby, it is possible to provide an LLD that is capable of detecting a flow (leakage flow) lower than the standard flow. Gravity will force the leaking liquid to move downwards, whereas the portion of the guide structure that is angled relative to vertical will concentrate the liquid.

In an embodiment, the pipe member is cylindrical. Integration with standard fittings and structures may be eased by applying a pipe member having a cylindrical geometry.

In an embodiment, it may be advantageous that the LLD comprises one or more housing structures provided with a sensor inlet configured to receive a radially extending sensor.

Hereby, it is possible to arrange the sensor in a position at or close to the measurement portion. In this manner, it is possible to insert the sensor through the sensor inlet in order to arrange the sensor in an optimum position for carrying out detection of the presence of liquid at the measurement portion. The use of a housing structure provided with a sensor inlet configured to receive a radially extending sensor makes it possible to radially insert the sensor into its measurement position. Moreover, it makes it possible to apply structures (e.g. electronic components) that are kept outside of the housing and outside the liquid flow. This may in particular be important if these structures require dry working conditions.

In an embodiment, it may be beneficial that the LLD comprises an insulator, wherein the guide structure is arranged at the inside surface of the insulator.

Hereby, it is possible to detect the presence of a liquid in the measurement portion by using a capacitive sensor.

The insulator may be made of any suitable insulation material. In an embodiment, the insulator is made of a plastic material such as an organic thermoplastic polymer like polyetheretherketone (PEEK).

In an embodiment, the guide structure is provided as an integrated part of the insulator.

In an embodiment, the insulator comprises a cylindrical portion.

In an embodiment, the one or more housing structures surround the insulator.

In an embodiment, the sensor is arranged in a position, in which the sensor has direct contact with the liquid passing the measurement portion.

In an embodiment, the sensor is an optical sensor.

In an embodiment, the sensor is an optical sensor comprising a light source configured to emit a light signal across the pipe member and a receiver configured to detect light reflected from the inside of the pipe member.

In an embodiment, the LLD comprises a battery for supplying electrical energy to the LLD.

In an embodiment, the LLD is configured to be connected to an electrical power source such as the main or another electrical power system.

In an embodiment, the LLD comprises one or more connection structures configured to be connected to the distal portion of an adjacent pipe structure. Such connection structures may include a flange structure configured to be mechanically connected to a corresponding flange of an adjacent structure.

In an embodiment, it may be an advantage that the LLD comprises an electrical circuit provided outside the housing structures.

Hereby, it is possible to ensure that the electrical circuit is kept in a safe and dry area during use. Accordingly, the risk of damage of the electrical circuit due to moisture or liquid can be eliminated.

In an embodiment, the electrical circuit comprises a processor and a communication unit configured to communicate with an external device.

In an embodiment, the electrical circuit comprises a processor and a communication unit configured to wirelessly communicate with an external device. In this embodiment, the communication unit may comprise a radio-frequency module configured to communicate with the external device by transmitting and/or receiving radio signals.

In an embodiment, it may be an advantage that the LLD comprises two or more housing structures adapted to be assembled to constitute a housing member. Hereby, it is possible to provide an easy manner to assemble and seal the LLD.

In an embodiment, the housing(s) and the guide structure are integrated to form a one-piece body.

In an embodiment, it may be beneficial that the LLD comprises an intermediate member configured to be arranged between two housing structures. Hereby, the intermediate member can be used to support and/or hold the sensor in a desired position with respect to the intermediate member and/or the one or more housing structures.

In an embodiment, it may be advantageous that one slot extends along the length of the housing. It may be beneficial that the length of the slot is longer than half the length of the housing.

Hereby, the slot makes it possible to apply a sensor assembly having a radially protruding portion that extends outwardly in extension from the sensor.

In an embodiment, it may be beneficial that the guide structure extends along a helix extending along the inside surface of the pipe member.

Hereby, it is possible to concentrate liquid in a manner, in which the liquid flows along the inside surface of the pipe member in a controlled way.

In an embodiment, the sensor is a capacitive sensor.

In an embodiment, the sensor is configured to carry out a detection at a single point.

Hereby, all liquid may be concentrated and detected at a single point. By concentrating the highest possible volume of liquid in the detection point it is possible to increase the detection limit of the liquid leakage detector.

In an embodiment, the sensor is configured to carry out detections at several points.

In an embodiment, the sensor is configured to carry out detections along the full circumference of the pipe member.

In an embodiment, the sensor is configured to carry out detections along at least half the circumference (180 degrees) of the pipe member.

In an embodiment, the sensor is configured to carry out detections along at least a quarter of the circumference (90 degrees) of the pipe member.

In an embodiment, the sensor comprises a communication unit configured to be connected to another communication unit. The communication unit may be configured to communicate with an external device.

Hereby, it is possible to send a signal to an external device when the sensor has detected a leaking liquid. The external device may be a smartphone, a computer (server) or the Internet by way of example.

In an embodiment, the LLD comprises a control unit, by which it is possible to turn on and switch off the LLD. Hereby, it is possible to let air flow through the LLD when the LLD is switched off. On the other hand, it is possible to turn on the LLD when no flow is expected to pass through the LLD.

In an embodiment, the sensor is an optical sensor.

In an embodiment, the sensor comprises a communication unit configured to communicate with an external device.

A method for detecting liquid from a liquid leakage detector, LLD, configured to detect liquid leaking from a liquid containing or liquid guiding element is disclosed herein, wherein the LLD comprises:

a pipe member configured to receive liquid leaking from a predefined area of the liquid containing or liquid guiding element; and a sensor configured to detect liquid entering the pipe member, wherein the method comprises the step of carrying out a capacitive measurement by means of a sensor that is electrically separated from the liquid transport structures.

Hereby, it is possible to provide a method that can detect a minimal leakage flow from a shut-off mechanism.

An LLD comprises a sensor configured to detect liquid entering the pipe member. By the term "a sensor" is meant at least one sensor. Accordingly, in an embodiment, the LLD comprises a single sensor. However, in another embodiment, the LLD comprises several sensors.

In an embodiment, the LLD comprises two sensors.

In an embodiment, the sensor is electrically separated from the liquid.

In an embodiment, the sensor is covered by an electric insulator.

In an embodiment, the method comprises the step of applying an LLD comprising a concentration structure extending along the inside surface of the pipe member, wherein the concentration structure comprises a guide structure configured to concentrate and guide liquid towards a measurement portion.

In an embodiment, it may be an advantage that the method comprises the step of leading the flow of liquid to pass over the sensor by means of the guide structure. Hereby, it is possible to apply a fixed sensor to detect the presence of liquid in a predefined area of the pipe structure.

In an embodiment, it may be an advantage that the method comprises the step of applying a guide structure comprising a portion that is angled relative to vertical during operation of the liquid leakage detector.

Hereby, it is possible to provide a method by which it is possible to detect a flow (leakage flow) lower than the standard flow.

In an embodiment, it may be advantageous that the method comprises the step of applying a capacitive sensor to detect the presence of liquid in a predefined area of the pipe structure.

In an embodiment, the method comprises the step of applying a sensor that is arranged in a position, in which the senor has direct contact with the liquid passing the measurement portion.

In an embodiment, the method comprises the step of generating an alert when a liquid leakage has been detected.

Hereby, it is possible to warn relevant staff about the leaking liquid. The alert may be visual (e.g. a light emitting diode), audible (e.g. a speaker). Alternatively, the alert may be sent to a smartphone as a message (e.g. a Short Message Service) or to a control system.

In an embodiment, the method comprises the step of carrying out a leakage detection at a single point.

In an embodiment, the method comprises the step of carrying out leakage detections at several points.

In an embodiment, the method comprises the step of carrying out leakage detections along the full circumference of the pipe member.

In an embodiment, the method comprises the step of carrying out leakage detections along at least half the circumference (180 degrees) of the pipe member.

In an embodiment, the method comprises the step of carrying out leakage detections along at least a quarter of the circumference (90 degrees) of the pipe member.

BRIEF DESCRIPTION OF THE DRAWINGS

The invention will become more fully understood from the detailed description given herein below. The accompanying drawings are given by way of illustration only, and thus, they are not limitative of the present invention. In the accompanying drawings:

FIG. 2A shows a cross-sectional view of an LLD according to an embodiment;

FIG. 2B shows a cross-sectional view of an LLD according to an embodiment;

FIG. 2C shows an exploded view of the LLD shown in FIG. 2A;

FIG. 9A shows a cross-sectional view of the LLD shown in FIG. 8B;

FIG. 9B shows a perspective view of the LLD shown in FIG. 2B; and

DETAILED DESCRIPTION

Referring now in detail to the drawings for the purpose of illustrating embodiments of the present invention.

Figure 1A:
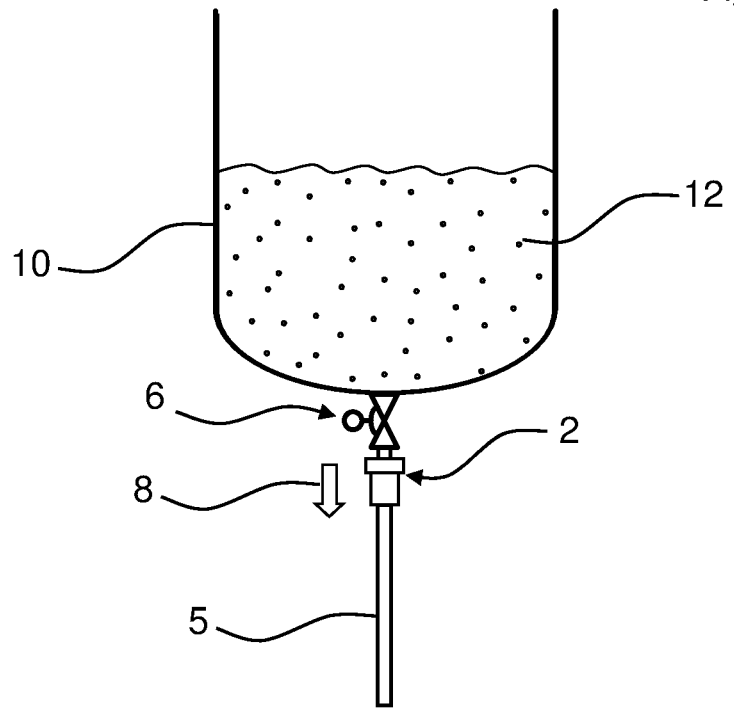
FIG. 1A shows a schematic side view of an LLD according to an embodiment.

An LLD 2 is illustrated in FIG. 1A, which is a schematic side view of LLD 2 according to an embodiment. The LLD 2 is arranged below a container 10 containing a liquid 12. An outlet portion is provided in the bottom portion of the container 10. A valve 6 is provided at the outlet portion of the container 10. A pipe 5 is attached to the distal end of the LLD 2. The LLD 2 is sandwiched between the container 10 and the pipe 5. Accordingly, liquid 12 leaking from the valve 6 will flow in the indicated direction 8 and be received by the LLD 2. Therefore, the LLD 2 is capable of detecting a liquid leaking from the valve 6.

Since the LLD 2 is arranged below the valve 6, gravity will cause liquid 12 leaking from the valve 6 to flow in the indicated direction 8. Accordingly, liquid 12 leaking from the valve 6 to be received by the LLD 2, whereby a detection of leaking liquid 12 is enabled.

During normal operation, the liquid 12 (e.g. water) will flow through the valve 6 and hereafter through the liquid leakage detector 2.

When the valve 6 is open and liquid 12 is flowing through the LLD 2, the LLD 2 will have no effect during normal flow conditions.

When the valve 6 is closed, it is the intention that no liquid flows through the valve 6. If the valve 6 starts to leak the leaking liquid 12 will flow through the LLD 2. The flow will typically be a small leakage flow (small stream or in droplets).

Figure 1B:
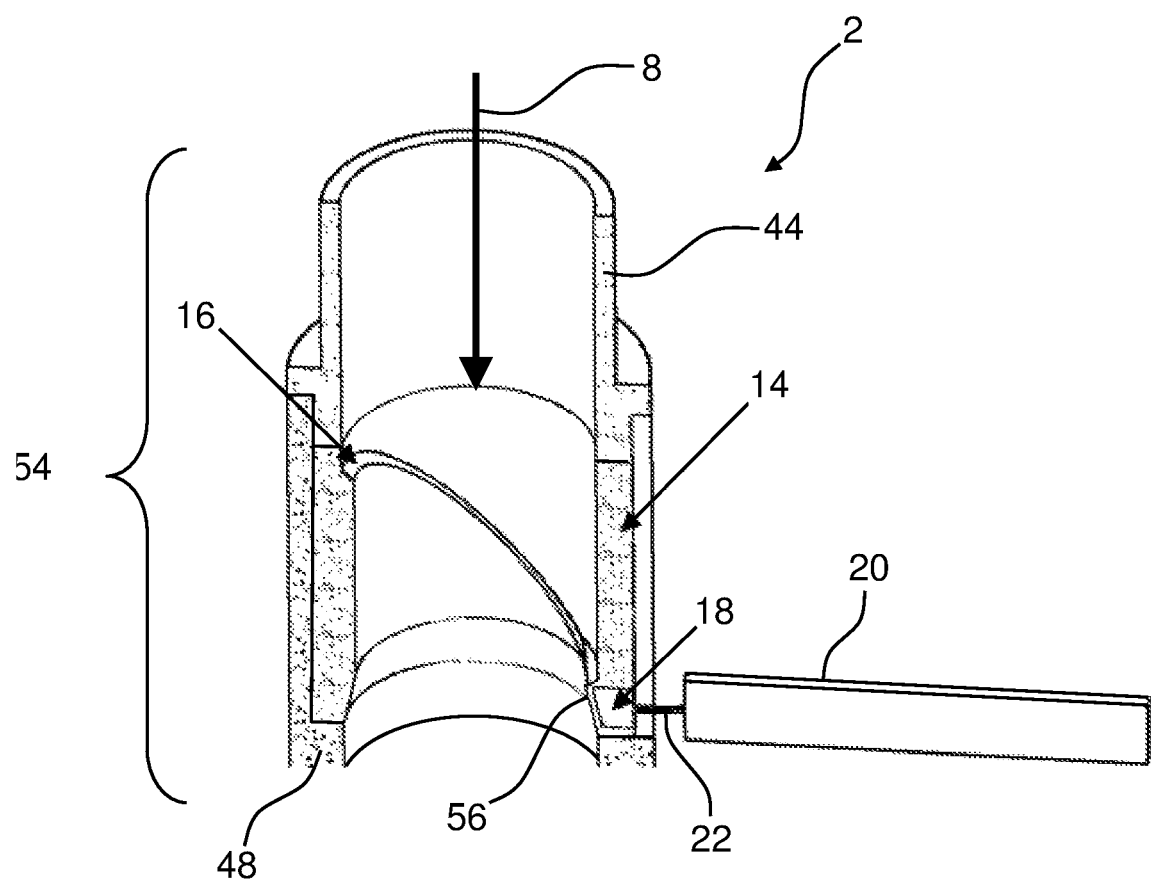
FIG. 1B shows a cross-sectional view of an LLD according to an embodiment.

FIG. 1B illustrates a cross-sectional view of an LLD 2 according to an embodiment. The LLD 2 comprises an insulator 14 being part of a pipe member 54. The pipe member 54 has a basically cylindrical portion. A concentration structure 16 extends along the inside surface of the insulator 14. The concentration structure 16 is formed as a guide structure 16 configured to concentrate and guide liquid flowing in the indicated direction 8 towards a measurement portion 56 provided at the inside surface of the insulator 14. The guide structure 16 extends along a helix extending along the inside surface of the insulator 14. The measurement portion 56 protrudes radially in an inwards direction. The wall thickness of the insulator 14 at the area of the measurement portion 56 is smaller than the wall thickness of the remaining portion of the insulator 14. The insulator 14 is sandwiched between a first housing structure 44 and another housing structure 48.

The LLD 2 comprises a sensor 18 configured and arranged to detect the presence of liquid at the measurement portion 56. In an embodiment, the sensor 18 is a capacitive sensor. The guide structure 16 is configured to lead the flow of liquid to pass over the sensor 18.

The guide structure 16 comprises a portion that is angled relative to the longitudinal axis of the pipe member 54 of the LLD 2. The pipe member 54 is provided with a sensor inlet configured to receive the sensor 18 being radially inserted into the sensor inlet.

An electrical circuit 20 provided with a surrounding encapsulation is electrically connected to the sensor 18. The longitudinal axis of the electrical circuit 20 extends basically perpendicular to the longitudinal axis of the pipe member 54. The electrical circuit 20 protrudes from the pipe member 54 and thus the electrical circuit 20 is arranged outside the pipe member 54. The top portion of the LLD 2 comprises a narrowing adapted to receive a corresponding tubular structure.

Inside the LLD 2, the leakage flow of the liquid will be guided over the sensor 18 and thus the LLD 2 will be able to detect a very small flow when the small stream or the droplets pass over the sensor 18. Accordingly, the sensor 18 will generate a signal indicative of the detected leakage.

When using a sensor technique that is sufficiently sensitive, it will be possible to detect flow volumes less than 5% of the design flow volume of the valve and pipe system. This is not possible with any existing equipment e.g. a flow meter.

In an embodiment, the sensor is capable of detecting a flow that is less than 5% of the design flow of the valve and pipe system.

FIG. 2A illustrates a cross-sectional view of an LLD 2 according to an embodiment, whereas FIG. 2C illustrates an exploded view of the LLD 2 shown in FIG. 2A. The longitudinal axis X of the LLD 2 is indicated. The LLD 2 comprises a ring-shaped sensor 18 configured to carry out measurements along its entire circumference.

The LLD 2 comprises a first pipe structure 28 and a second pipe structure 30 configured to be connected to each other. The first pipe structure 28 comprises a flange 24 configured to be connected to a corresponding structure (e.g. a flange). Likewise, the second pipe structure 30 comprises a flange 26 configured to be connected to a corresponding structure (such as a flange).

The second pipe structure 30 comprises an annular protruding structure 34 and a distal portion 35 extending in extension of the annular protruding structure 34. The first pipe structure 28 comprises an outer structure 32 configured to be received by and hereby surround the distal portion 35 of the second pipe structure 30. The outer structure 32 is provided with a slot 40 extending parallel to the longitudinal axis X.

The LLD 2 comprises an insulating intermediate member 36 configured to be fully inserted into and hereby be surrounded by the outer structure 32. The intermediate member 36 comprises two cylindrical annular protruding structures 38, 38' provided at the end portions of the intermediate member 36. The diameter of the protruding structures 38, 38' is larger than the diameter of the cylindrical portion of the intermediate member 36 extending between the annular protruding structures 38, 38'.

The LLD 2 comprises a ring-shaped capacitive sensor 18 configured to be arranged and held in place by means of the intermediate member 36. By arranging the sensor 18 between annular protruding structures 38, 38', it is possible to prevent the sensor 18 from being axially displaced (along the longitudinal axis X) relative to the intermediate member 36.

When the sensor 18 is mounted within the LLD 2 (as shown in FIG. 2A), a connection member 22 protrudes radially from the ring-shaped portion of the sensor 18. The connection member 22 is intended for electrically connecting the ring-shaped portion of the sensor 18 with an electrical circuit like the one shown in FIG. 1B. The flanges 24, 26 may comprise a ring-shaped groove configured to receive a sealing member (e.g. an O-ring). The structures extending between the flanges 24, 26 constitute a pipe member 54.

FIG. 2B illustrates a cross-sectional view of an LLD 2 according to an embodiment. The LLD 2 comprises a pipe structure 30 that comprises a basically cylindrical portion. In an embodiment, the pipe structure 30 is made of an electrically conducting material such as steel, e.g. stainless steel.

The LLD 2 comprises a narrow portion 52 formed as a pipe structure that comprises a basically cylindrical portion and is arranged in the opposite end than the pipe structure 30.

The LLD 2 comprises a guide structure 16 that extends along the inside surface of an insulator 14 that is surrounded by an outer structure 32. The guide structure 16 is configured to concentrate and guide liquid towards a measurement portion provided in a position at which a capacitive sensor 18 is capable of detecting the presence of liquid. The measurement portion is provided at the inside surface of the insulator 14 and protrudes therefrom. The guide structure 16 extends along a helix extending along the inside surface of the insulator 14. In another embodiment, the guide structure 16 may have another geometry. A narrow portion 52 is provided in each end of the pipe member 54.

The sensor 18 is electrically connected to an electrical circuit 20. As indicated, the electrical circuit 20 and the outside surface of the narrow portion 52 of the pipe member 54 are grounded. The capacitance C to be measured by the sensor 18 is schematically indicated. The insulator 14 is sandwiched between a protruding structure 46 and another housing structure 48. The capacitive sensor 18 is configured to detect when the measurement portion is at least partly covered by a liquid. The capacitive sensor 18 is configured to detect and measure anything that is conductive or has a dielectric different from air.

Figure 3A:
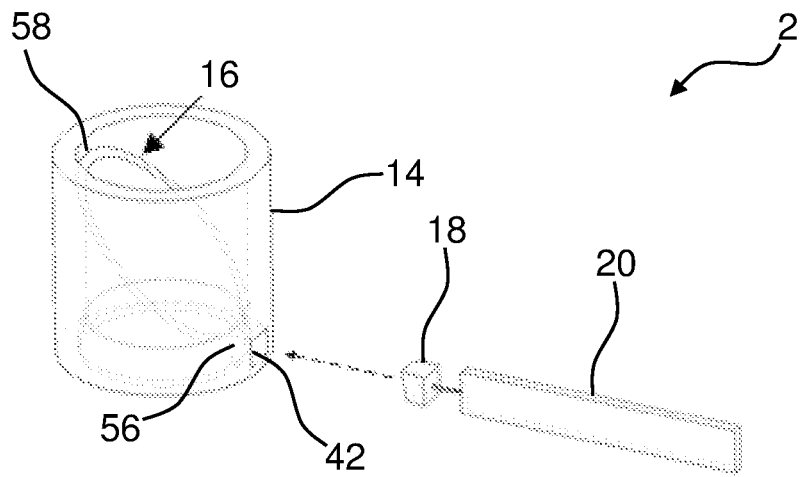
FIG. 3A shows an LLD according to an embodiment.

FIG. 3A illustrates an LLD 2 according to an embodiment. The LLD 2 comprises an insulator 14 having a basically cylindrical form. The LLD comprises a guide structure 16 comprising two symmetrical portions each constituting a portion of a helix, wherein said portions extend between a top portion 58 of the guide structure 16 and a measurement portion 56 provided in the bottom of the portions. Accordingly, the guide structure 16 will guide any liquid flowing along the inside surface of the insulator towards the measurement portion 56.

The LLD 2 comprises a sensor 18 configured to be inserted through an opening 42 provided in the insulator 14. Hereby, it is possible to radially insert the sensor 18 into the measurement portion 56. An electrical circuit 20 is electrically connected to the sensor 18. The opening 42 constitutes a non-through-going hole configured to receive and hold the sensor 18. By ensuring that the opening 42 constitutes a non-through-going hole it is possible to prevent liquid from leaving the insulator 14 through the opening 42.

Figure 3B:
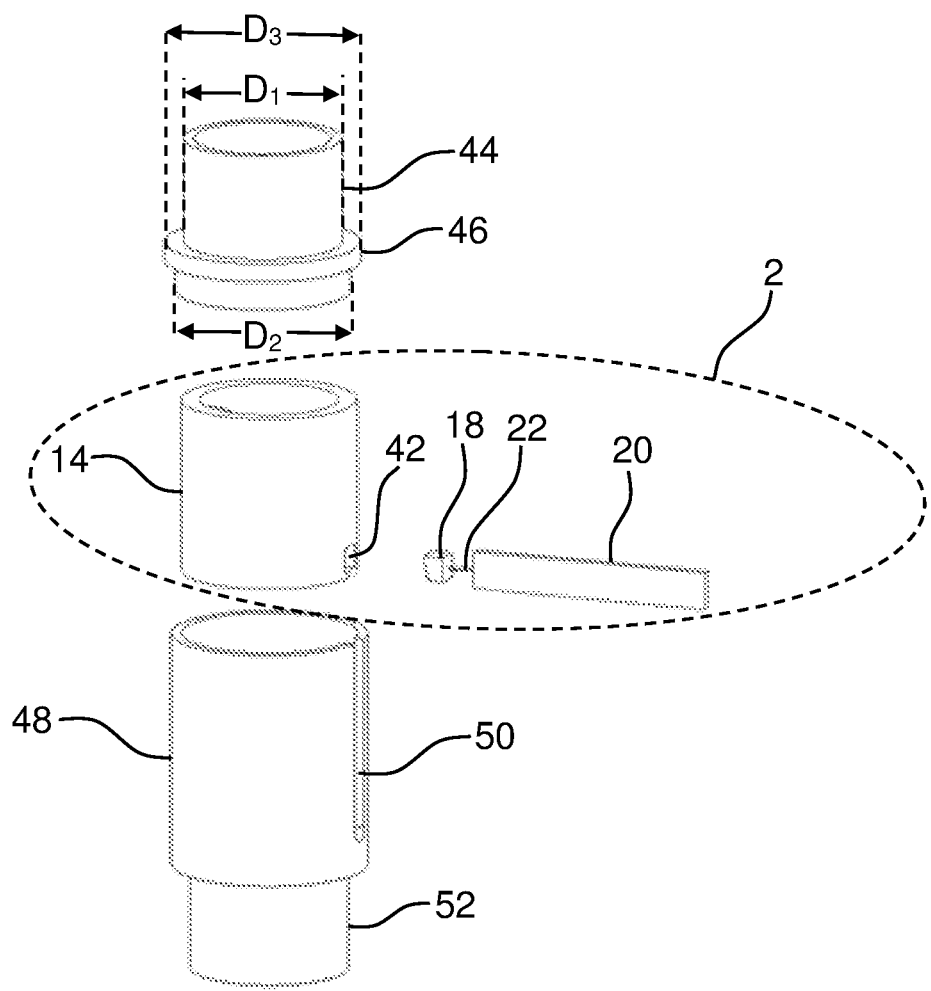
FIG. 3B shows an LLD according to an embodiment.

FIG. 3B illustrates an LLD 2 according to an embodiment. The LLD 2 comprises a basically cylindrically shaped insulator 14 provided with a non-through-going opening 42 like the one explained with reference to FIG. 3A. The LLD 2 comprises a sensor 18 and an electrical circuit 20 corresponding to the ones explained with reference to FIG. 3A. Above the LLD 2, a first housing structure 44 having a first cylindrical distal portion with a first diameter $D_1$ is arranged. Below the LLD 2, a second opposite cylindrical distal portion with a second larger diameter $D_2$ and a third cylindrical portion (arranged between the first and second cylindrical distal portion) having an even larger diameter $D_3$ are arranged.

The housing structure 48 is provided with a first portion having a first diameter and a second portion having a smaller diameter. The second portion constitutes a narrowing 52. A slot 50 extending along the length of the housing structure 48 is provided in the first portion. The slot 50 extends from the distal portion of the first portion of the housing structure 48 to an area near the proximal portion of the first portion of the housing structure 48.

The distal portion of the first portion of the housing structure 48 is configured to receive the insulator 14 and the cylindrical distal portion of the first housing structure 44. The embodiment illustrated in FIG. 3B shows how to provide an LLD 2, in which the sensor 18 can be mounted in a practical way. The pieces 44, 46, 48, 52 may be produced in any suitable material e.g. metal such as stainless steel. The insulator 14 may be produced in a plastic material e.g. by using an injection molding process. The parts illustrated in FIG. 3B are configured to be put together to form an LLD 2 enclosed by pipe elements, configured to be connected to a valve, a pipe or another structure for detecting a leaking liquid.

Figure 4A:
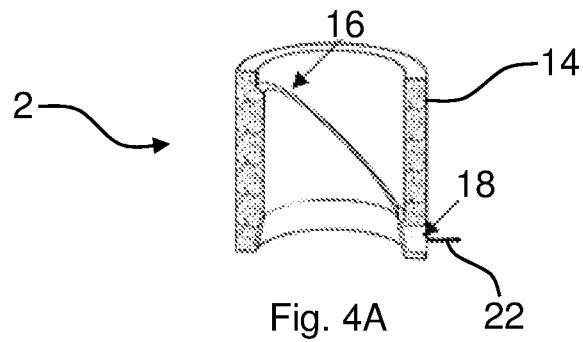
FIG. 4A shows a cross-sectional view of an LLD according to an embodiment.

FIG. 4A illustrates a cross-sectional view of an insulator 14 of an LLD 2 according to an embodiment. The insulator 14 has a cylindrical portion and is provided with a guide structure 16 extending along the inside surface thereof. A sensor 18 is provided at the end portion of the insulator 14. A connector 22 extends from the sensor 18. The connector 22 may be connected to any suitable device such as a unit comprising a printed circuit board comprising a communication unit (or communication module) configured to communicate with an external receiver. The connector 22 may be connected to a unit configured to read the measurements carried out by the sensor 18 and to process these data in order to provide analyzed data.

Figure 4B:
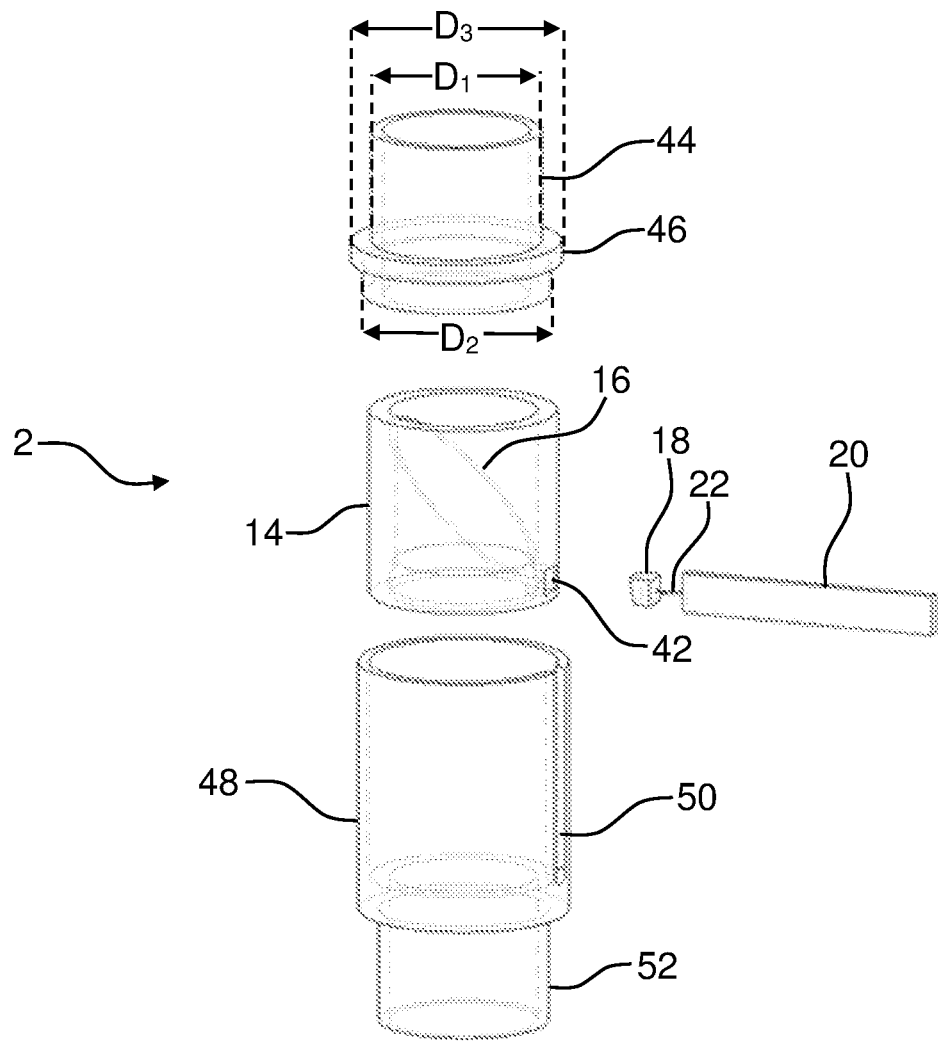
FIG. 4B shows another view of the LLD shown in FIG. 3B.

FIG. 4B illustrates a view of an LLD 2 according to an embodiment. The LLD 2 corresponds to the one explained with reference to FIG. 3B. The walls of the structures are, however, transparent. Therefore, the inner contours of the structures can be seen.

Figure 5:
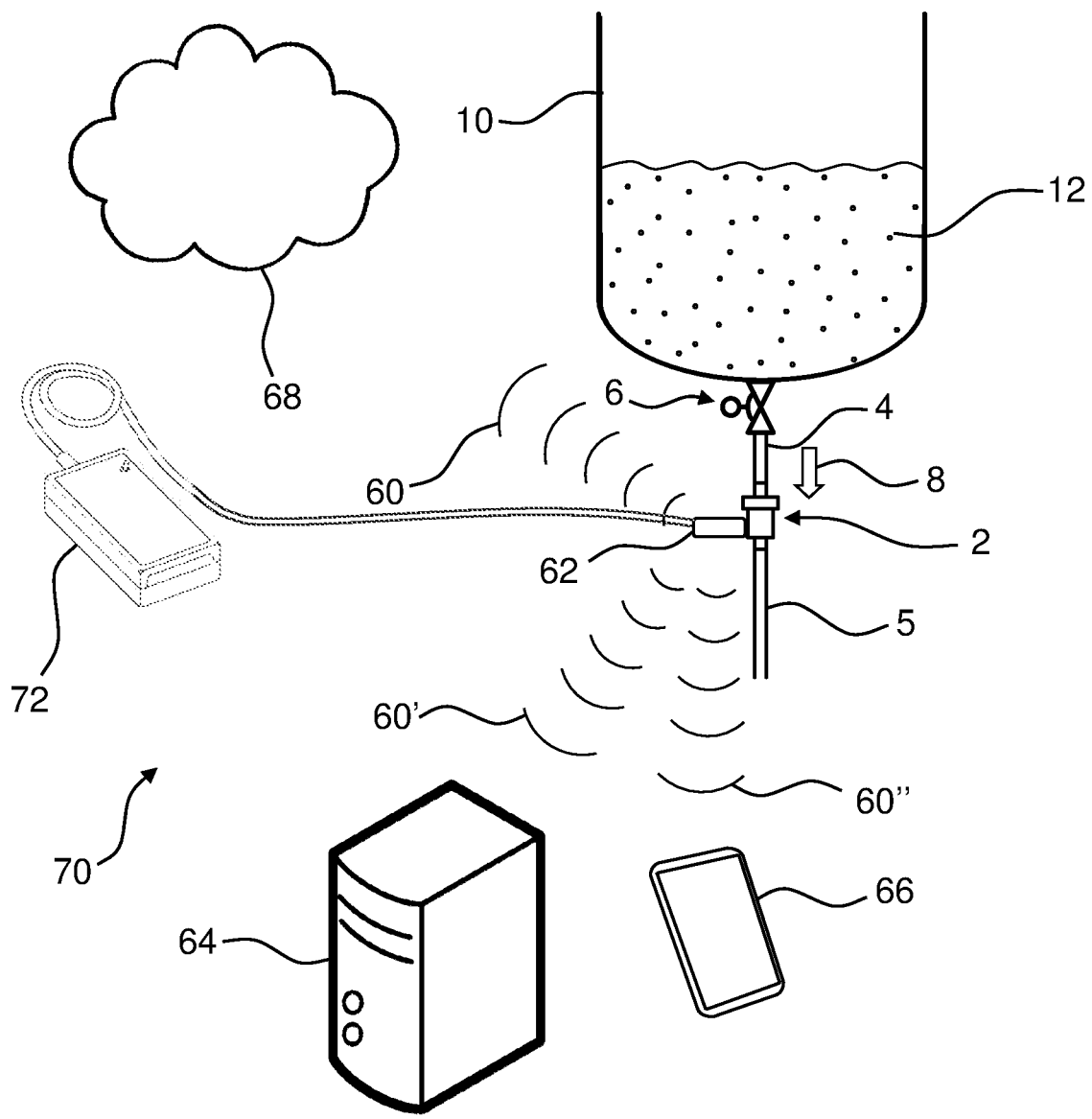
FIG. 5 shows a view of a system comprising an LLD according to an embodiment.

FIG. 5 illustrates a view of a system 70 comprising an LLD 2 according to an embodiment. The LLD 2 is arranged below a container 10 containing a liquid 12, wherein the container 10 comprises an outlet portion provided in the bottom portion of the container 10. A valve 6 is provided at the outlet portion of the container 10. A pipe 4 is provided at the distal end of the valve 6. However, the LLD 2 may be connected to the valve 6 as illustrated in FIG. 1A. A second pipe 5 is attached to the outlet of the LLD 2.

Since the LLD 2 is connected to the pipe 4, liquid 12 leaking from the valve 6 will flow in the indicated direction 8 and be received by the LLD 2. Accordingly, the LLD 2 can detect liquid leaking from the valve 6.

In an embodiment, the LLD is integrated in the valve 6.

A communication unit 62 is connected to the sensor of the LLD 2. The communication unit 62 is configured to communicate wirelessly with one or more external devices. In an embodiment, the communication unit 62 is configured to communicate wirelessly with a computer 64 and thus send wireless signals 60' to the computer 64.

In an embodiment, the communication unit 62 is configured to communicate wirelessly with a smartphone 66 including sending wireless signals 60" to the smartphone 66.

In an embodiment, the communication unit 62 is configured to communicate wirelessly with the Internet 68 including sending signals 60 to the Internet 68.

In an embodiment, the communication unit 62 is electrically connected to a Programmable Logic Controller (PLC) 72.

In practice, the communication unit 62 may be connected to one or more of the computer 64, the smartphone 66, the Internet 68 and/or the PLC 72.

In an embodiment, the LLD 2 comprises an alert module configured to generate an alert if leaking liquid is detected by the sensor of the LLD 2. The alert module may include or be connected to a visual alert unit (e.g. a light source such as a light-emitting diode). The alert module may include or be connected to an audible alert unit (e.g. a speaker unit).

In an embodiment, the LLD 2 is configured in such a manner that when a leakage flow is detected by the LLD 2 a signal is generated. This signal can be a sound, a light or an electrical signal sent to an electronic data processing system. Hereby, it is possible to provide a real-time registration of a leakage of the system 70. Accordingly, product loss, loss of media, contamination or hazardous spillage can be minimized or prevented.

In an embodiment, the LLD 2 according to an embodiment is an electrical device with a sensor technology built into the device in such a manner that the device directs the flow in a structure above the sensor towards the sensor in order to detect a flow that is minimal compared to the standard flow of the design flow for a given system.

Accordingly, the LLD 2 according to an embodiment differs from existing prior art instruments with respect to the lower limit of detection (defined as the lowest quantity of liquid that can be detected). Thus, the LLD 2 according to an embodiment can detect a leakage flow that is lower than the designed flow for a given system.

The LLD 2 according to an embodiment can be installed in or after a system. It is an advantage that the LLD 2 according to an embodiment can be installed directly in the flow direction and directly after the shut-off construction (e.g. a valve) without restricting the designed flow for the given system.

In an embodiment, the LLD 2 is able to detect a small stream or even droplets escaping a leaking system.

In an embodiment, the LLD 2 is configured to work both as an indicator and a transmitter.

Figure 6A:
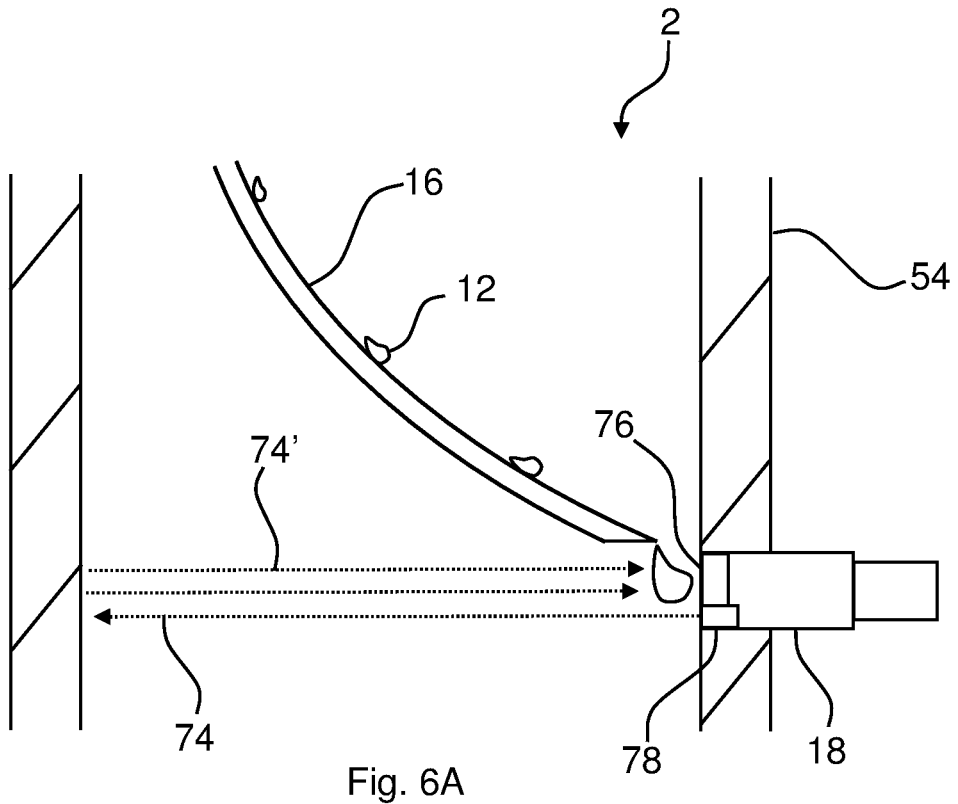
FIG. 6A shows a cross-sectional view of an LLD according to an embodiment.

FIG. 6A illustrates a cross-sectional view of an LLD 2 according to an embodiment. The LLD 2 comprises a cylindrical pipe member 54. A guide structure 16 is provided at the inside surface of the pipe member 54. The guide structure 16 is formed to concentrate and guide liquid 12 to the distal portion of the guide structure 16 at which an optical sensor 18 is arranged.

The pipe member 54 may be made of any suitable material such as metal, plastic or glass. In the embodiment shown in FIG. 6A, the pipe member 54 is made of metal (e.g. stainless steel) or plastic. The sensor 18 is arranged in a through-going opening provided in the wall of the pipe member 54. Hereby, the sensor can transmit light 74 by means of a transmitter 78 arranged in the front end of the sensor 18. The sensor 18 comprises a receiver 76 arranged and configured to receive light 74' reflected by the inside of the pipe member 54. In an embodiment, a material having a high reflection coefficient is provided at the position at the inside of the pipe member 54, in which the transmitted light 74 is reflected.

The sensor 18 is configured to detect when liquid 12 is present at the distal end of the guide structure 16. The sensor 18 detects when the quantity of reflected light 74' is reduced. The quantity of reflected light 74' is reduced when liquid 12 absorbs and/or reflects some of the reflected light 74' so that less light is received by the receiver 76.

Figure 6B:
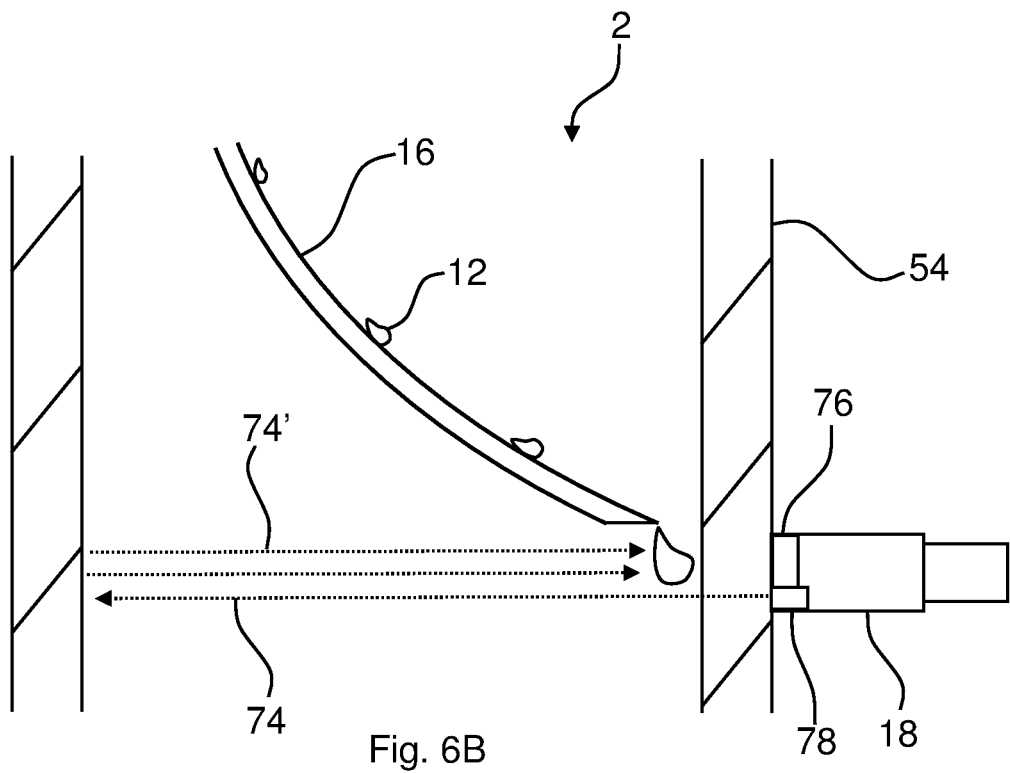
FIG. 6B shows a cross-sectional view of another LLD according to an embodiment.

FIG. 6B illustrates a cross-sectional view of another LLD 2 according to an embodiment. The LLD 2 comprises a cylindrical pipe member 54 that comprises a transparent area. A guide structure 16 is provided at the inside surface of the pipe member 54. The guide structure 16 is formed to concentrate and guide liquid 12 to the distal portion of the guide structure 16 at which an optical sensor 18 is arranged. The optical sensor 18 is arranged outside the pipe member 54 at the transparent area. Hereby, the sensor can transmit light 74 through the transparent area of the pipe member 54. Light 74 is transmitted by means of a transmitter 78 arranged in the front end of the sensor 18. The sensor 18 comprises a receiver 76 arranged and configured to receive light 74' reflected by the inside of the pipe member 54. A material having a high reflection coefficient may be provided at the position at the inside or outside of the pipe member 54, in which the transmitted light 74 is reflected.

The sensor 18 is configured to detect when a liquid 12 is present at the distal end of the guide structure 16. The sensor 18 detects when the quantity of reflected light 74' is reduced. The quantity of reflected light 74' is reduced when liquid 12 absorbs and/or reflects some of the reflected light 74' so that less light is received by the receiver 76.

Figure 7B:
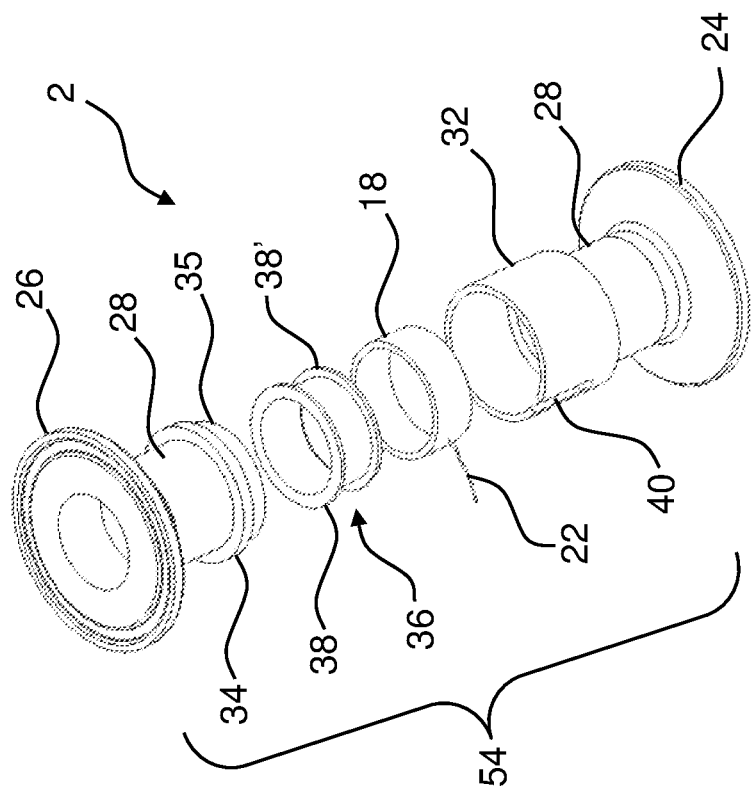
FIG. 7B shows a perspective, exploded view of an LLD according to an embodiment.
Figure 7A:
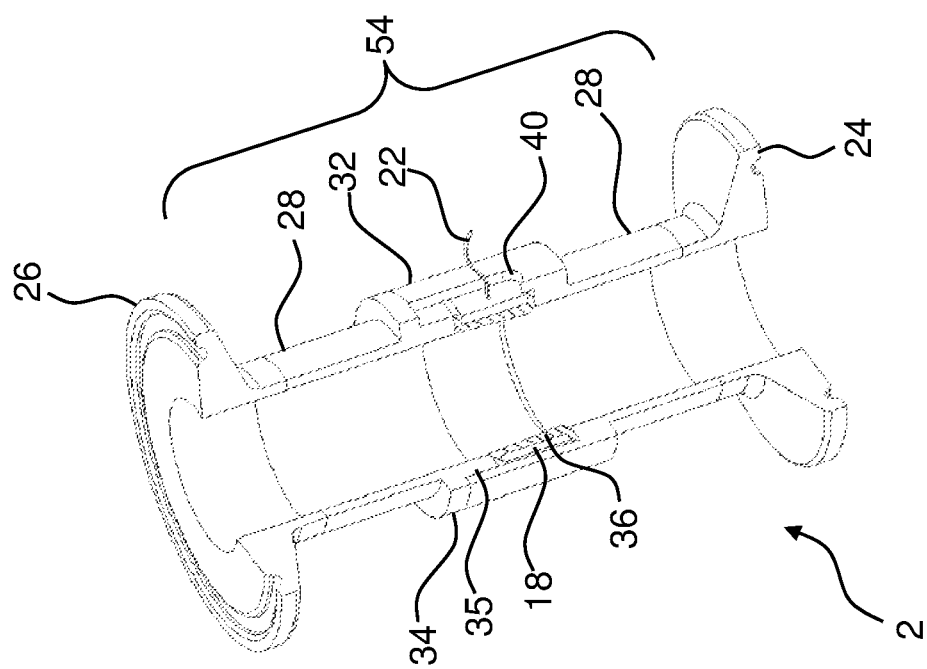
FIG. 7A shows a perspective view of an LLD according to an embodiment.

FIG. 7A illustrates a perspective view of an LLD 2 according to an embodiment. The LLD 2 corresponds to the one shown in FIG. 2A.

FIG. 7B illustrates a perspective, exploded view of the LLD 2 corresponding to the one shown in FIG. 2A.

Figure 8B:
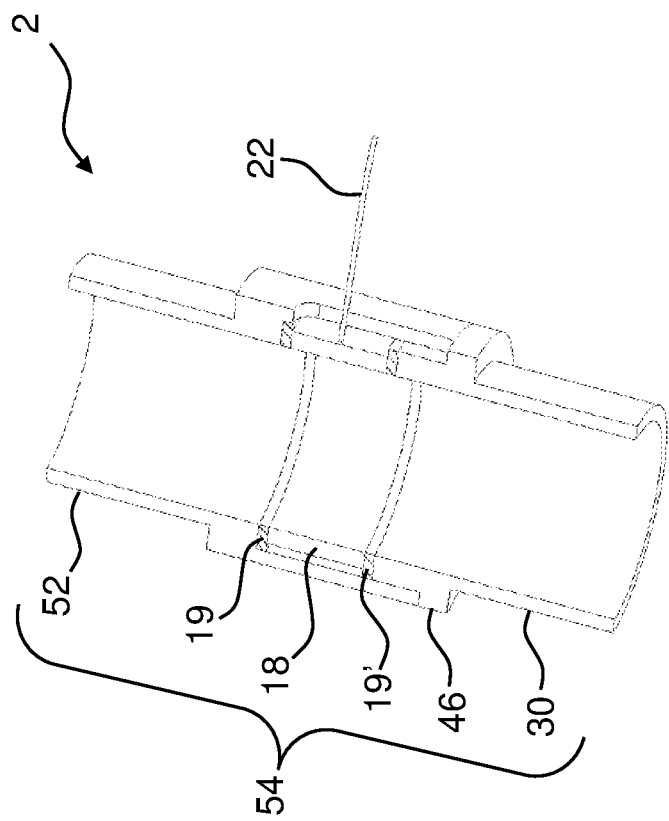
FIG. 8B shows a perspective view of the LLD shown in FIG. 8A.
Figure 8A:
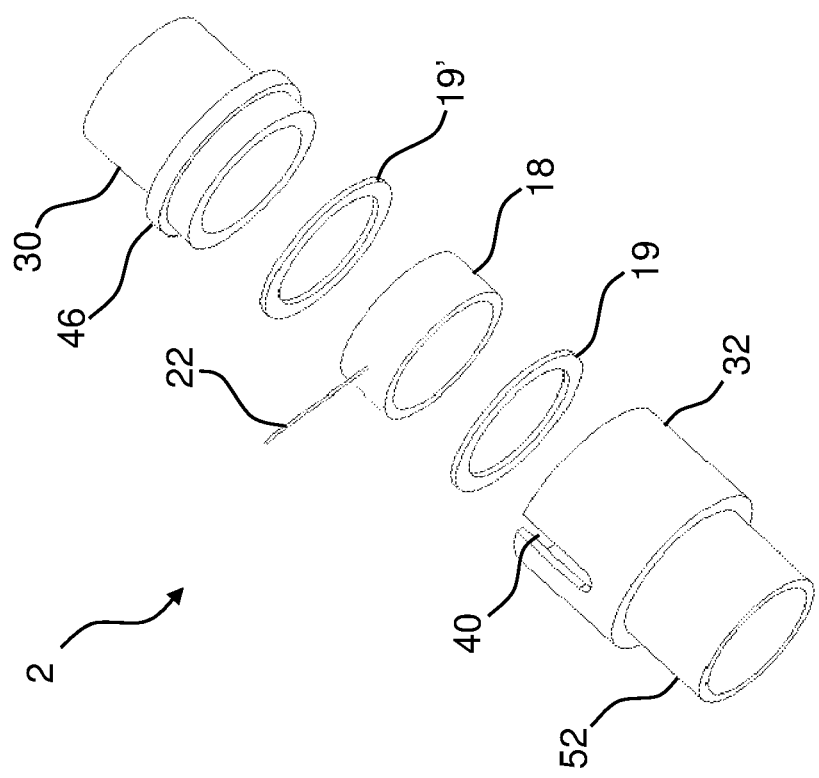
FIG. 8A shows an exploded view of an LLD according to an embodiment.

FIG. 8A illustrates a cross-sectional view of an LLD 2 according to an embodiment. The LLD 2 comprises a capacitive sensor 18. In an embodiment, the sensor 18 is provided with a ring-shaped sensing structure arranged inside a ring-shaped body portion. Accordingly, in this embodiment, the sensing structure arranged inside the cylindrical surface of the body portion will not be directly exposed to liquid during use because the ring-shaped body portion separates the ring-shaped sensing structure from the liquid.

In another embodiment, the sensor 18 is formed as a ring-shaped sensing structure that is intended to come into contact with the liquid to be detected.

The LLD 2 comprises a first insulation ring 19 and a second insulation ring 19' shaped to bear against the axial end surfaces of the body portion of the capacitive sensor 18. Accordingly, the insulation rings 19, 19' are configured to electrically insulate the body portion of the capacitive sensor 18 from the adjacent structures of the LLD 2. Moreover, the insulation rings 19, 19' seal the body portion of the capacitive sensor 18 against the adjacent structures.

The LLD 2 comprises a first end portion comprising a pipe structure 30 provided with a radially protruding ring-shaped protruding structure 46. The LLD 2 comprises a second end portion comprising a tubular outer structure 32 provided with a cylindrical narrow portion extending in extension of the outer structure 32. The outer structure 32 is configured to receive the proximal portion of the pipe structure 30. A connection member 22 formed as an electric cable extends from the body portion of the capacitive sensor 18. The connection member 22 is configured to be electrically connected to an electric circuit.

FIG. 8B illustrates a perspective view of the LLD 2 shown in FIG. 8A. It can be seen that the outer structure 32 and the pipe structure 30 are attached to one another and that they constitute a pipe member 54 that can be connected between a first liquid transport structure (not shown) and a second first liquid transport structure (not shown).

FIG. 9A illustrates a cross-sectional view of the LLD 2 shown in FIG. 8B.

FIG. 9B illustrates a perspective view of the LLD 2 shown in FIG. 2B.

Figure 10:
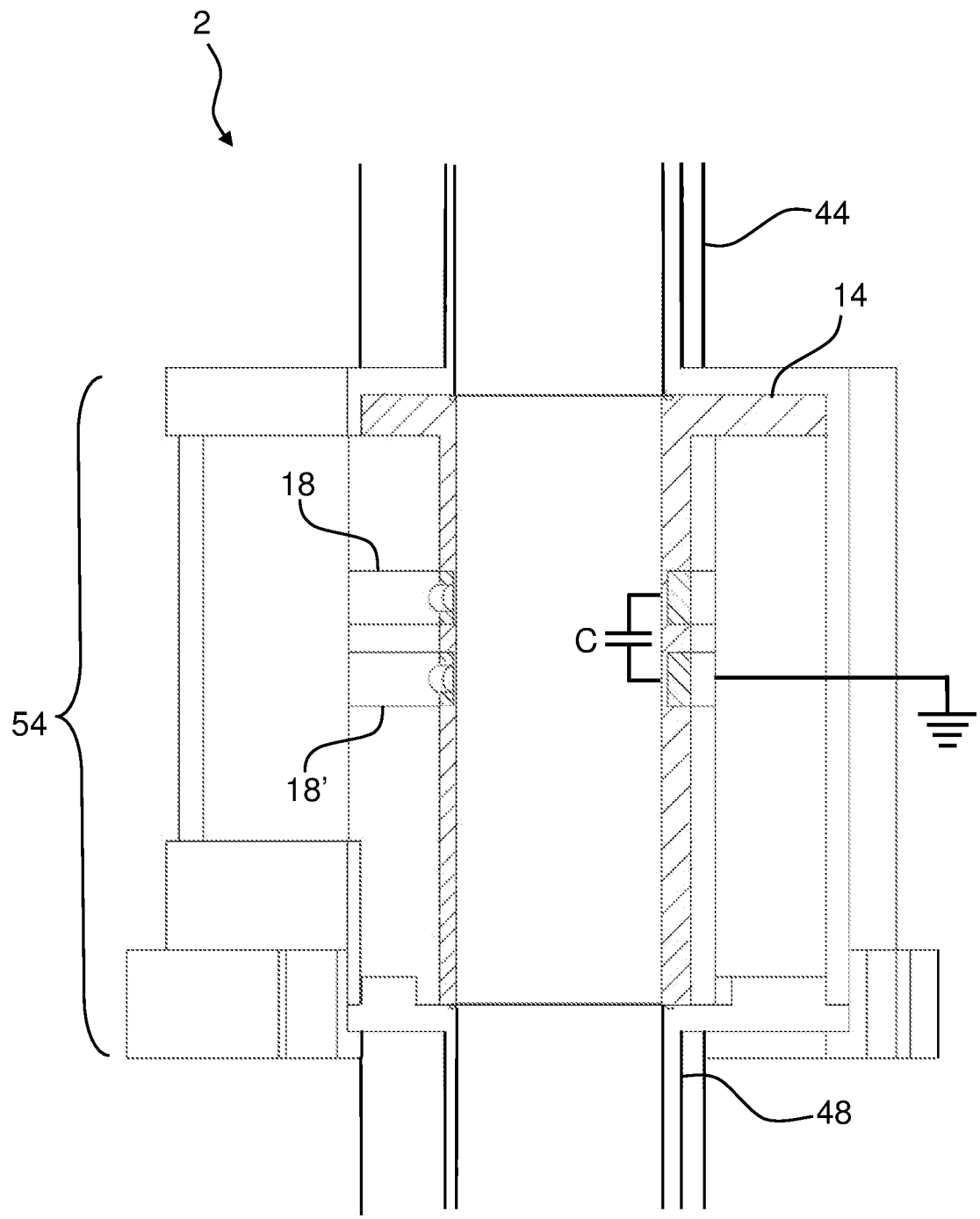
FIG. 10 shows a cross-sectional view of an LLD according to an embodiment.

FIG. 10 illustrates a cross-sectional view of an LLD 2 according to an embodiment. The LLD 2 comprises an insulator 14 being part of a pipe member 54. The pipe member 54 has a basically cylindrical portion. The insulator 14 is sandwiched between a first housing structure 44 and another housing structure 48.

The LLD 2 comprises a first capacitive sensor 18 arranged next to a second capacitive sensor 18'. These sensors 18, 18' are arranged very close to each other and are configured and arranged to detect the presence of liquid.

Inside the LLD 2, the leakage flow of the liquid will flow over the first sensor 18 and the second sensor 18'. Accordingly, the LLD 2 is able to detect a very small flow when the small stream or the droplets pass over the sensors 18, 18'. The LLD 2 is configured to generate a signal indicative of the detected leakage when the capacitance C is changed do to a shift in the media covering areas of the sensors 18, 18'. It can be seen that the sensors 18, 18' are ring-shaped and that the second sensor 18' is electrically connected to ground. In an embodiment, one of the sensors 18, 18' is electrically connected to ground while the other is electrically connected to an electrical circuit (not shown).

LIST OF REFERENCE NUMERALS

2 Liquid leakage detector (LLD)
4 Pipe
5 Pipe
6 Valve
8 Flow direction
10 Container
12 Liquid
14 Insulator
16 Guide structure
18, 18' Sensor
19, 19' Insulation ring
20 Electrical circuit
21 Groove for sealing member
22 Connection member
24 Flange
26 Flange
28, 30 Pipe structure
32 Outer structure
34 Annular protruding structure
35 Distal portion
36 Insulating intermediate member
38, 38' Annular protruding structure
40 Slot
42 Opening
44 Housing structure
46 Protruding structure
48 Housing structure
50 Slot
52 Narrow portion
54 Pipe member
56 Measurement portion
58 Top portion
60, 60', 60" Wireless signal
62 Communication unit
64 Computer
66 Smartphone
68 Internet
70 System
72 Programmable Logic Controller (PLC)
74, 74' Light
76 Receiver (e.g. optical sensor)
78 Transmitter
X Longitudinal axis
C Capacitance
$D_1$, $D_2$, $D_3$ Diameter

What is claimed is:

1. A liquid leakage detector (LLD) configured to detect liquid leaking from a liquid containing element, the LLD comprising:
    a pipe member configured to receive liquid leaking from a predefined area of the liquid containing element, the pipe member comprising a first conduit member and a second conduit member in fluid communication with each other and with the liquid containing element;
    a sensor configured to detect liquid within the pipe member, wherein the sensor is shaped as an annulus; and
    an insulator electrically separating the sensor from the first and second conduit members.

2. The LLD according to claim 1, wherein the insulator is shaped as an annulus.

3. The LLD according to claim 2, wherein the sensor is disposed between the insulator and the first conduit member.

4. The LLD according to claim 1, wherein the sensor is physically separated from the liquid in the pipe member.

5. The LLD according to claim 1, wherein the insulator forms a portion of an interior wall of the pipe member.

6. The LLD according to claim 1, wherein the sensor is a capacitive sensor.

7. The LLD according to claim 1, wherein the insulator electrically insulates the sensor from the first conduit member and the second conduit member.

8. The LLD according to claim 1, further comprising a guide structure extending along an inside surface of the pipe, the guide structure configured to concentrate and guide liquid towards a measurement portion of the pipe member.

9. The LLD according to claim 8, wherein the guide structure forms a helix along the inside surface of the pipe.

10. The LLD according to claim 1, further comprising one or more housing structures provided with a sensor inlet configured to receive a radially extending sensor.

11. The LLD according to claim 10, further comprising an electrical circuit disposed outside the one or more housing structures.

12. The LLD according to claim 11, wherein at least one of the housing structures comprises a slot extending along its length.

13. A method for detecting liquid from a liquid leakage detector (LLD) configured to detect liquid leaking from a liquid containing element, the method comprising:
    providing an LLD having:
        a pipe member configured to receive liquid leaking from a predefined area of the liquid containing element, the pipe member comprising a first conduit member and a second conduit member in fluid communication with each other and with a liquid transport structure of the liquid containing element;
        a sensor configured to detect liquid within the pipe member, wherein the sensor is shaped as an annulus; and
        an insulator electrically separating the sensor from the first and second conduit members;
    measuring capacitance with the sensor; and
    determining the presence of liquid leaking from the liquid containing element when the measured capacitance is greater than zero.

14. The method according to claim 13, wherein the insulator is shaped as an annulus.

15. The method according to claim 14, wherein the sensor is disposed between the insulator and the first conduit member.

16. The method according to claim 13, wherein the sensor is electrically separated from the liquid.

17. The method according to claim 13, wherein the insulator forms a portion of an interior wall of the pipe member.

18. The method according to claim 13, further comprising a guide structure extending along an inside surface of the pipe, the guide structure configured to concentrate and guide liquid towards a measurement portion housing the sensor.

19. The method according to claim 18, wherein the guide structure forms a helix along the inside surface of the pipe member.

20. The method according to claim 13, further comprising the step of generating an alert when a liquid leakage has been detected.

\* \* \* \* \*